United States Patent [19]
Khachatoorian

[11] Patent Number: 6,095,531
[45] Date of Patent: Aug. 1, 2000

[54] HAND TRUCK WITH STAIR TREAD ROLLER ASSEMBLY

[75] Inventor: Zareh Khachatoorian, City of Industry, Calif.

[73] Assignee: Olympia industrial, Inc., City of Industry, Calif.

[21] Appl. No.: 09/042,830

[22] Filed: Mar. 17, 1998

[51] Int. Cl.[7] .................................................... B62B 5/02
[52] U.S. Cl. ..................... 280/5.22; 280/47.27; 305/109; 305/116
[58] Field of Search ................................ 280/5.22, 47.27, 280/47.2; 305/116, 121, 165, 109, 120, 193

[56] References Cited

U.S. PATENT DOCUMENTS

| | | |
|---|---|---|
| 1,992,702 | 2/1935 | Koop ....................................... 301/109 |
| 2,132,069 | 10/1938 | Hall . |
| 2,193,283 | 3/1940 | Harberson . |
| 2,301,341 | 11/1942 | Stevens et al. . |
| 2,411,408 | 11/1946 | Armington ............................... 301/109 |
| 2,620,041 | 12/1952 | Chenette et al. . |
| 4,136,888 | 1/1979 | Bowie . |
| 4,290,618 | 9/1981 | Morton . |
| 4,391,341 | 7/1983 | Taghon .................................... 301/109 |
| 4,962,940 | 10/1990 | Cuschera ................................ 280/5.22 |
| 5,253,881 | 10/1993 | Dunkle . |

*Primary Examiner*—Anne Marie Boehler
*Attorney, Agent, or Firm*—James E. Brunton, Esquire

[57] ABSTRACT

An improved hand truck apparatus for use in moving loads up and down stair which includes a pair of novel stair tread engaging assemblies which operate smoothly and in a relatively friction-free manner. The stair engaging belts of each of the stair tread engaging assemblies is supported by a plurality of freely rotating, spaced-apart rollers which are grooved to closely receive and support the lower portion of the belts in the manner to positively guide the belts around the belt supporting frames of the assemblies as the rollers freely rotate about their individual axles. The roller supporting frame of each of the stair tread engaging assemblies is uniquely provided with guide means for guiding the stair tread engaging belts into the channels formed in the rollers and for preventing undesirable frictional contact between the belt and the supporting frame as the belt travels about the supporting rollers.

12 Claims, 4 Drawing Sheets

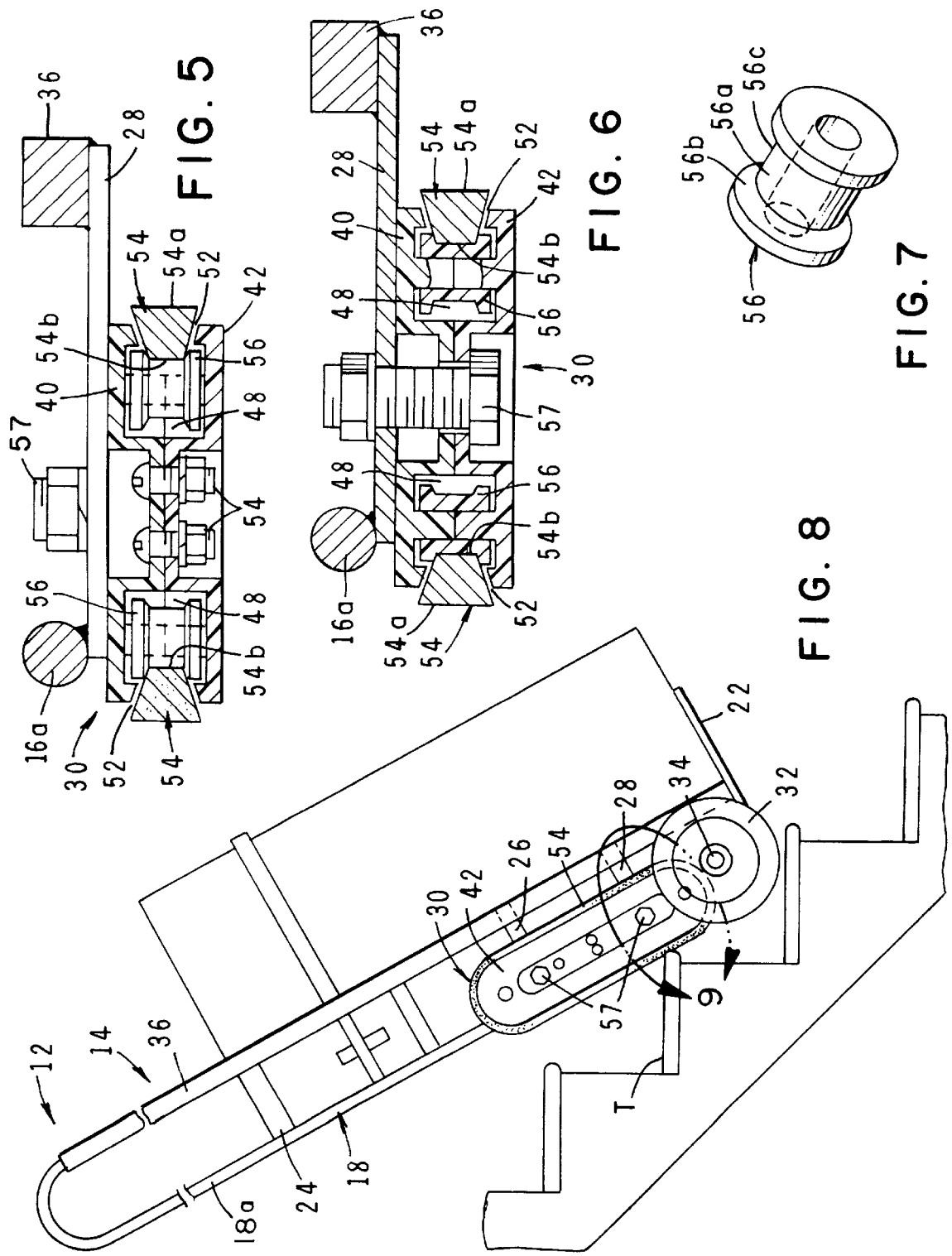

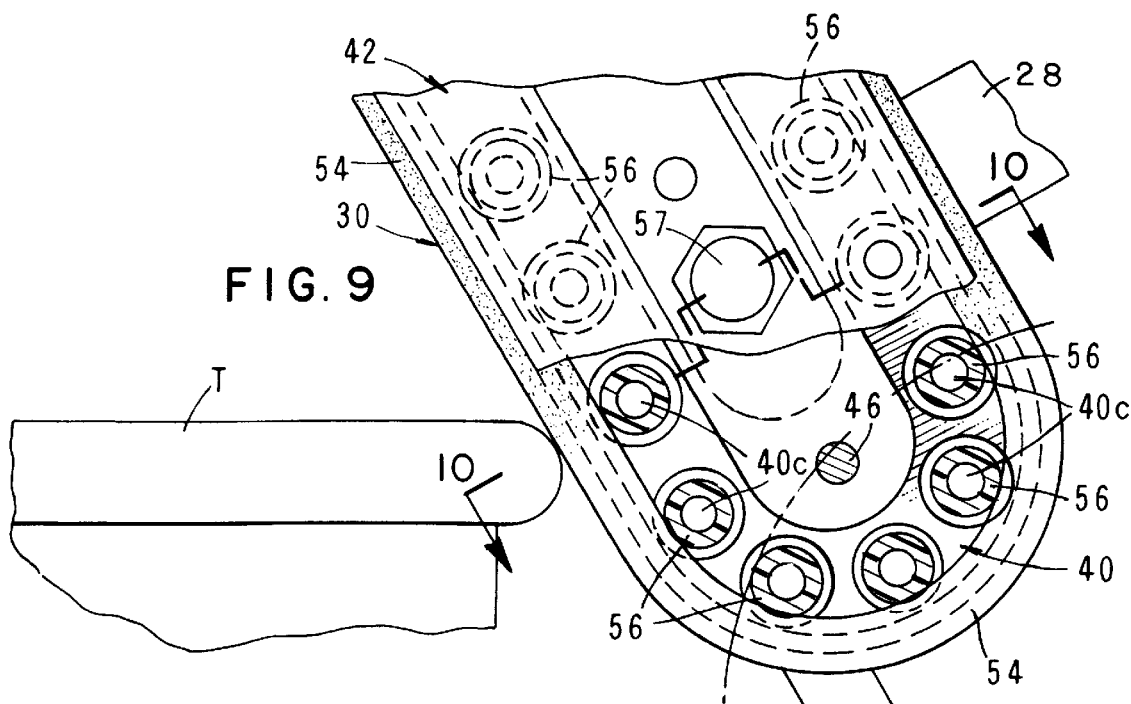
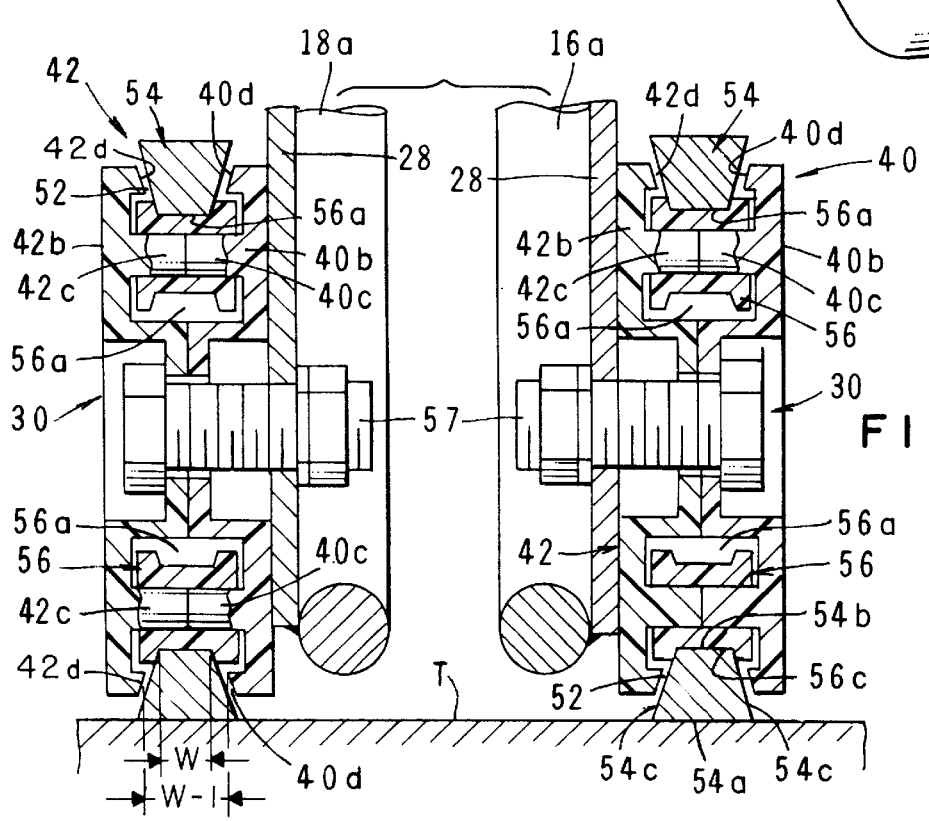

HAND TRUCK WITH STAIR TREAD ROLLER ASSEMBLY

BACKGROUND OF THE INVENTION

1. Field of the Invention

The present invention relates generally to hand trucks. More particularly, the invention concerns an improved hand truck having novel stair tread roller assembles which enable the user to easily move loads up and down stairs using the hand truck.

2. Discussion of the Prior Art

Hand trucks are not new and several variations thereof have been used over the years to move heavy loads from place to place. However, the conventional hand truck is not well suited for moving loads up and down stairs. Accordingly, a number of hand truck designs have been suggested to alleviate this problem. Typically these prior art designs involve the addition to the conventional hand truck of stair tread engaging devices which facilitate movement of the hand truck on stairways.

Exemplary of a prior art hand truck design having stair tread engaging devices is that disclosed in U.S. Pat. No. 4,290,618 issued to Morton. The Morton device comprises a hand truck to which a pair of specially designed stair tread engaging roller assemblies have been added. These roller assemblies include an endless V-belt which rides along a plurality of barrel shaped rollers having flat end walls and a bulging side wall. Each of the rollers is mounted in an individual cavity in the device frame and is rotatable within the cavity about its own axis. The rollers are generally linearly aligned and are non-linearly movable with respect to the frame. The tread engaging device further includes flanges for maintaining the V-belt on the device.

Another useful prior art hand truck device is that disclosed in U.S. Pat. No. 5,253,881 issued to Dunkle. Like the Morton device, the Dunkle hand truck includes a pair of stair crawler assemblies which are mounted on the side frames of the hand truck. Each of the crawler assemblies includes a pair of spaced apart bearing retainer plates between which a plurality of roller bearings are mounted. The roller bearings collectively support an endless belt member which engages the stair treads.

Other prior art devices which embody stair tread engaging devices are described in U.S. Pat. No. 2,193,283 issued to Harberson; U.S. Pat. No. 2,301,341 issued to Stevens et al and U.S. Pat. No. 4,136,888 issued to Bowie, Jr. et al.

A major drawback of many of the prior art hand trucks with stair tread engaging devices resides in the fact that because of the design of the stair tread engaging assemblies considerable friction is created tending to impede smooth and free movement of the tread engaging belts relative to the frame of the assembly about which the belt is entrained. For example, in certain of the prior art devices in which the rollers rotate in cavities, the end walls of the rollers frictionally engage the side walls of the cavities within which the rollers rotate. Also, during operation of certain of the prior art devices, the stair tread engaging belts have a tendency to rub against the side walls of the frame about which they are entrained causing further friction. In other prior art devices in which the belt supporting rollers are not individually rotatably supported by the axles the rollers tend to engage their adjacent rollers causing additional friction build-up.

It is the foregoing and various other drawbacks of the prior art which the present invention seeks to overcome by providing an apparatus which is constructed in a manner to effectively prevent friction buildup. More particularly, this is uniquely achieved by providing properly designed, individually mounted, freely rotatable belt supporting rollers and properly designed supporting frames which effectively guide the belts into engagement with the rollers without frictionally engaging the sides of the supporting frames. In this way, an easy-to-use, minimum friction and smoothly operating apparatus is provided which permits relatively friction free movement of the stair tread engaging belts about the supporting frame of the device.

SUMMARY OF THE INVENTION

It is an object of the present invention to provide an improved hand truck apparatus for use in moving loads up and down stairs which includes novel stair tread engaging assemblies which operate smoothly and in a relatively friction-free manner.

Another object of the present invention is to provide an improved hand truck apparatus of the aforementioned character in which the stair engaging belt of the stair tread engaging assemblies is supported by a plurality of freely rotating, spaced-apart rollers which are channeled to closely receive and support the lower portion of the belt in a manner to guide its free movement about the supporting frame of the assembly as the rollers freely rotate about individual, roller-supporting axles.

Another object of the invention is to provide stair tread engaging assemblies of the character described in which the rollers are constructed and arranged to uniformly distribute the load placed on the stair tread engaging belts of the assemblies.

Another object of the invention is to provide an apparatus of the type described in the preceding paragraphs in which the roller supporting frames of the stair tread engaging assemblies are uniquely provided with guide means for guiding the stair tread engaging belts into the channels formed in the rollers and prevent undesirable contact between the belt and the supporting frame as the belt travels about the supporting rollers.

Another object of the invention is to provide uniquely designed stair tread engaging assemblies of the aforementioned character which are of a simple construction that enables them to be inexpensively manufactured and assembled.

Another object of the invention is to provide an improved hand truck apparatus of the type described in the preceding paragraphs which is easy to use, is highly durable and reliable and one which requires minimum maintenance.

The foregoing and other objects of the invention are realized by the novel apparatus illustrated in the drawings and described in the paragraphs which follow.

BRIEF DESCRIPTION OF THE DRAWINGS

FIG. 5 is a reduced cross-sectional view taken along lines 5—5 of FIG. 4, but showing both side plates which make up the roller supporting body.

FIG. 6 is a reduced cross-sectional view taken along lines 6—6 of FIG. 4, but showing both side plates which make up the roller supporting body.

FIG. 7 is a generally perspective view of one of the rollers of the stair tread roller assemblies of the invention.

FIG. 8 is a generally diagrammatic, side-elevational view of one side of the hand truck frame of the apparatus partly broker away and illustrating the manner of use of the improved hand truck of the apparatus of the present invention.

FIG. 9 is a greatly enlarged, side-elevational view of the portion of the apparatus identified in FIG. 8 by the numeral 9.

FIG. 10 is an enlarged, cross-sectional view taken along lines 10—10 of FIG. 9, but showing in cross section both of the stair tread engaging assemblies.

In FIG. 1 through 4, one form of the improved hand truck apparatus of the present invention is there illustrated and generally designated by the numeral 12. As best seen in FIG. 1, the apparatus comprises a main frame 14 which includes interconnected first and second side handle frames 16 and 18 respectively. Each of the side or handle frames 16 and 18 include generally U-shaped tubular member designated as 16a and 18a respectively. The upper bight portions of the U-shaped tubular members form gripping handles for gripping by the user of the hand truck while the lower portion of each side frame includes an in-turned connector section 20, the free end 20a of which is interconnected with a sole plate 22, which, in turn, spans and is connected to the side frames (see FIGS. 1 and 2).

Disposed the intermediate the upper and lower end portions of each of the side frames are first, second and third cross braces 24, 26, and 28 respectively. In a manner presently to be described, cross-brace 26 and 28 function to support the novel stair tread engaging assemblies of the invention which assemblies are generally designated in the drawings by the numeral 30. Provided proximate the lower ends of the side frames are wheels 32. As shown in FIGS. 1 and 2, wheels 32 are rotatably mounted on a transversely extending axle 34 (FIG. 1) which is suitably interconnected to connector sections 20 of the side frames in the manner shown. Provided on the front leg of each of the U-shaped tubular members 16a and 18a is a generally rectangularly shaped load engaging member 36.

Figure 1:
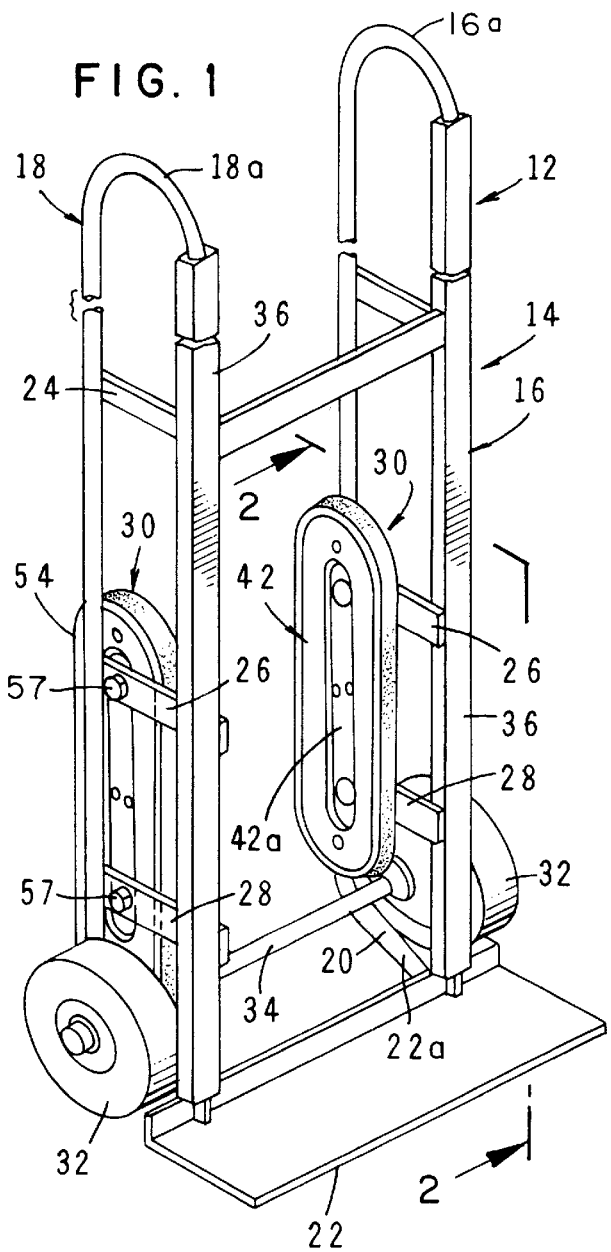
FIG. 1 is a generally perspective view of a hand truck of one form of the invention which embodies the improved stair tread roller assemblies.
Figure 2:
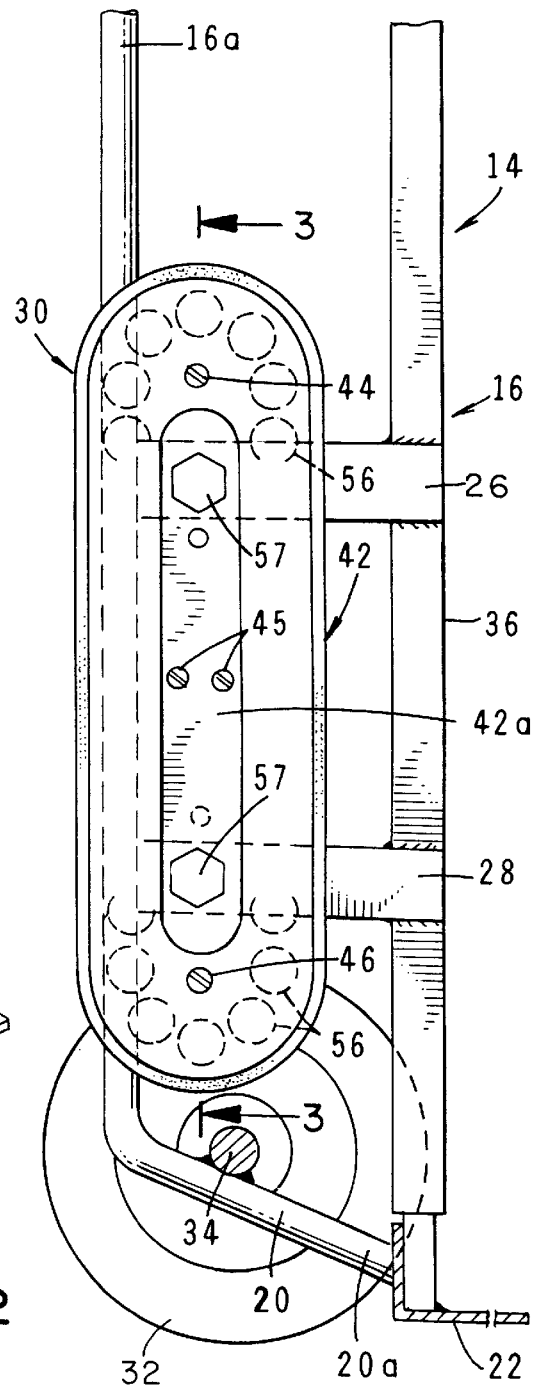
FIG. 2 is a view taken along lines 2—2 of FIG. 1.
Figure 3:
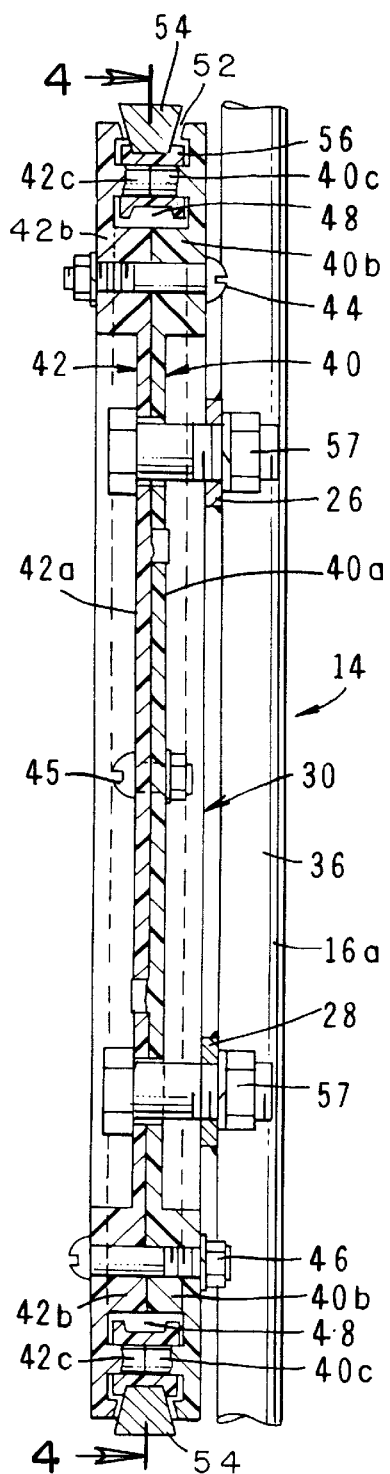
FIG. 3 is an enlarged cross-sectional view taken along lines 3—3 of FIG. 2.
Figure 4:
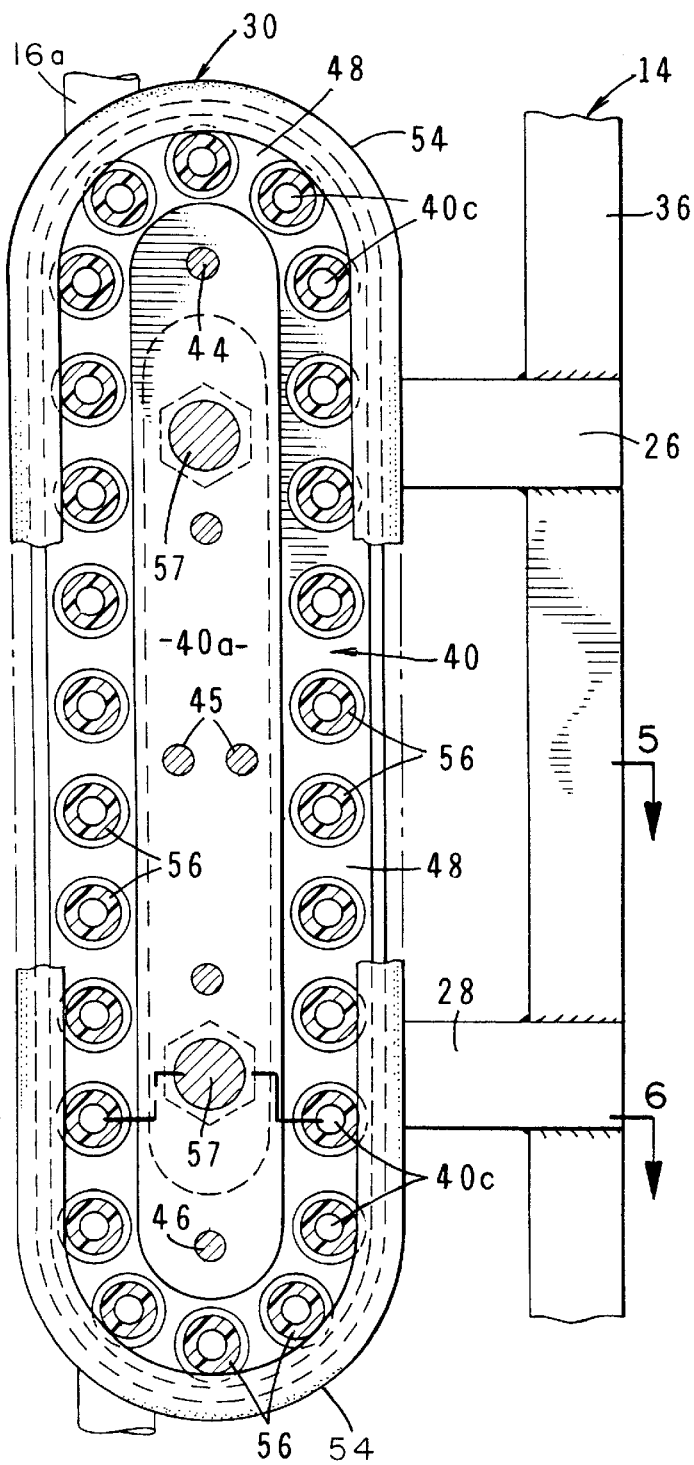
FIG. 4 is a cross-sectional view taken along lines 4—4 of FIG. 3.

Referring particularly to FIGS. 3 and 4, one form of the novel stair tread engaging assembly of the apparatus of the invention is there shown. Each stair tread engaging assembly 30 of the pair of assemblies used in the apparatus of the invention is identical to the other and, as previously mentioned, are mounted to cross brace 26 and 28 of the hand truck frame. Each assembly 30 comprises a body portion made up of a pair of identical, interconnected body plates 40 and 42 (FIG. 3). Each of the body plates 40 and 42 includes a central portion designated in FIG. 3 by the numerals 40a and 42a respectively. Similarly, each of the body plates has a peripheral portion designated in FIG. 3 by the numerals 40b and 42b respectively. Body plates 40 and 42 are interconnected by securement means shown here as conventional threaded connectors or bolts 44, 45 and 46. When plates 40 and 42 are interconnected in the manner shown in FIG. 3, they cooperate to define an elongated channel 48 which circumscribes the central portions 40a and 42a of interconnected plates 40 and 42. Each of the side plates 40 and 42 is provided with a plurality of circumferentially spaced, inwardly extending stub axles designated in the drawings by the numerals 40c and 42c (FIG. 3). As best seen in FIG. 3, stub axles 40c and 42c extend into channel 48 and span at least a portion of channel 48. The peripheral portions 40b and 42b of the side plates also cooperate to define an elongated access opening 52 having side walls substantially parallel to sides of a V-belt 54 for closely receiving the V-belt. As indicated in FIGS. 3, 5, and 6, each V-belt 54 is generally trapezoidal in cross section and has a wide side 54a which is adapted to engage the stair tread and a narrow side 54b which is adapted to engage the rollers 56, which also form a part of the tread engaging assemblies of the invention.

Rollers 56, which are rotatably supported by stub axles 40c and 42c are of the unique configuration shown in FIG. 7. As seen in FIG. 7 each roller includes a peripheral portion having with a belt receiving channel 56a. Channel 56a is defined by angularly inwardly sloping side walls 56b and a base wall 56c. As best seen in FIG. 10, belt receiving channels 56a are configured to closely receive the lower portion of the trapezoidal shaped belts 54. As also shown in FIG. 10, each of the plates 40 and 42 is provided with angularly inwardly inclined side walls 40d and 42d respectively which comprise the guide means of the invention for guiding belts 54 into proper engagement with rollers 56. Turning also to FIG. 3 it is to be noted that each of the stair tread engaging assemblies is interconnected with the hand truck frame by connector means shown here as upper and lower connectors 57 which comprise conventional threaded nuts and bolts.

As previously mentioned, endless V-belt 54, when viewed in cross section, has a wide side 54a, which is adapted to engage the stair tread "T" in the manner shown in FIG. 10, and a narrow side 54b, which is adapted to engage base wall 56c of roller 56. Side walls 54c interconnect with the wide side and narrow side of the belt. Referring particularly to the lower, left-hand portion of FIG. 10, it is to be observed that the belt receiving channel 56a has a maximum width "W" while the inclined side walls 40d and 42d of the body plates are spaced apart by a distance "W–1", which is greater than width "W". With this construction, when the belt 54 is positioned within the belt receiving channel 56a of the rollers 56 in the manner shown in the lower left-hand portion of FIG. 10, the belt is prevented from frictionally engaging the inclined side walls 40d and 42d of plates 40 and 42 respectively. Centering belt 54 within the wider access opening formed in the side plates prevents the belts from rubbing against the side plates and thereby significantly reduces the friction buildup that occurs in prior art devices in which the stair tread engaging belt is not constrained from rubbing against the roller supporting frames.

In summary, with the novel construction of the stair tread engaging assemblies of the present invention as shown in the drawings, the tread engaging belt is positioned on each of the rollers so that during operation of the hand truck, the belt does not touch the frame and thus does not create undue and unwanted friction. Further because the short side walls of the rollers are tapered to match the angle of the side wall 56b of the belt, the belt positively engages the rollers in a manner to evenly distribute the load along the plurality of rollers and cause the rollers to rotate about their respective stub axles rather than the belt being permitted to slide over the surface of the rollers as happens in several of the prior art devices. This free and smooth rolling of the rollers about their individual axles once again substantially reduces friction during operation of the apparatus of the invention.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In a hand truck apparatus having a main frame, including side handle frames and ground engaging wheels rotatably connected to the handle frames, the improvement comprising a stair tread engaging assembly connected to one of the side handle frames, the stair tread engaging assembly comprising:

(a) an endless V-belt;
   (b) an elongated body having a central portion and a peripheral portion circumscribing said central portion, said peripheral portion having an elongated roller receiving channel having an access opening for receiving said endless V-belt, said access opening being defined by guide means provided on said body for guiding said V-belt into said access opening, said guide means comprising inwardly sloping side walls provided on said peripheral portion which are substantially parallel to inwardly sloping sides of said V-belt;
   (c) a plurality of spaced-apart axles spanning at least a portion of said channel; and
   (d) a roller rotatably carried by each said axle, said roller having a peripheral portion and a belt receiving channel formed in said peripheral portion for closely receiving a portion of said endless V-belt and for centering said V-belt relative to said access opening, said belt receiving channel having inwardly sloping side walls terminating at a base wall.

2. An apparatus as defined in claim 1 in which said endless V-belt is generally trapezoidal in cross section having a wide side adapted to engage a stair tread and a narrow side adapted to engage said base wall of said belt receiving channel formed in each said roller.

3. An apparatus as defined in claim 1 in which said elongated body is formed by a pair of mating body plates which are secured together by securement means.

4. An apparatus defined in claim 1 further including connector means for connecting said elongated body to one of the side members of the handle frame.

5. An apparatus as defined in claim 1 in which said belt receiving channel formed in said roller has a maximum width and in which said inclined side walls of said guide means are spaced apart by a distance greater than said maximum width whereby, when said belt is positioned with said belt receiving channel, it is prevented from engaging said inclined side walls of said guide means.

6. In a hand truck apparatus having a main frame, including a pair of said handle frames and ground engaging wheels rotatably connected to the main frame, the improvement comprising a pair of stair tread engaging assemblies connected to the main frame, each of the pair of stair tread engaging assemblies comprising:

(a) an endless V-belt;
   (b) a pair of interconnected body plates each having a central portion and a peripheral portion circumscribing said central portion, said peripheral portions of said body plates cooperating to define an elongated roller receiving channel having an access opening for receiving said endless V-belt each of said body plates having an inwardly sloping side wall provided on said peripheral portion thereof which is substantially parallel to an inwardly sloping side of said V-belt for guiding said V-belt into said access opening;
   (c) a plurality of spaced-apart, outwardly extending stub axles provided on each said body plate; and
   (d) a plurality of rollers rotatably carried by said stub axles, each said roller having a peripheral portion provided with a belt receiving channel for closely receiving a portion of said endless V-belt and for centering said V-belt relative to said access opening, said belt receiving channel having inwardly sloping side walls terminating at a base wall.

7. An apparatus as defined in claim 6 in which said endless V-belt is generally trapezoidal in cross section having a wide side adapted to engage a stair tread, a narrow side adapted to engage said base wall of said belt receiving channel formed in each said roller and side walls interconnecting said wide side and said narrow side, a portion of said side walls engaging said inwardly sloping side walls of said belt receiving channel formed in each said roller.

8. An apparatus as defined in claim 7 in which said belt receiving channel formed in each said roller has a maximum width and in which, when said body plates are interconnected, said inclined side walls of said body plates are spaced apart by a distance greater than said maximum width whereby when said belt is positioned with said belt receiving channel, it is prevented from engaging said inclined side walls of said body plates.

9. An improved hand truck apparatus comprising:

(a) a main frame having interconnected side handle frames, each said side handle frames having an upper handle portion, a lower portion and an intermediate portion;
   (b) a wheel rotatably mounted to each said side handle frames proximate said lower portion thereof; and
   (c) a stair tread engaging assembly connected to said intermediate portion of each said side handle frames, each said stair tread engaging assembly comprising:
      (i) an endless, generally trapezoidal shaped V-belt having a wide side adapted to engage a stair tread and a narrow side;
      (ii) an elongated body having a central portion and a peripheral portion circumscribing said central portion, said peripheral portion having an elongated roller receiving channel having an access opening for receiving said endless V-belt, said access opening being defined by angularly inclined side walls formed on said elongated body proximate said roller receiving channel and aligned therewith for guiding said V-belt into said access opening, said side walls being substantially parallel to inwardly sloping sides of said V-belt;
      (iii) a plurality of spaced apart axles spanning at least a portion of said channel; and
      (iv) a roller rotatably carried by each said axle, said roller having a peripheral portion and a belt receiving channel formed in said peripheral portion for closely receiving a portion of said endless V-belt and for centering said V-belt relative to said access opening, said belt receiving channel having inwardly sloping side walls terminating at a base wall adapted to engage said arrow side of said V-belt.

10. An apparatus as defined in claim 9 in which said elongated body is formed by a pair of identical mating body plates which are secured together by securement means.

11. An apparatus defined in claim 9 further including connector means for connecting said elongated body to one of said side handle frames of said main frame.

12. An apparatus as defined in claim 9 in which said belt receiving channel formed in said roller has a maximum width and in which said inclined side walls of said guide means are spaced apart by a distance greater than said maximum width whereby, when said belt is positioned with said belt receiving channel, it is prevented from engaging said inclined side walls of said guide means.

* * * * *